(12) United States Patent
Honkomp et al.

(10) Patent No.: US 12,662,000 B2
(45) Date of Patent: Jun. 23, 2026

(54) METHOD FOR OPERATING A DRIVE SYSTEM

(71) Applicant: AUDI AG, Ingolstadt (DE)

(72) Inventors: Franz Honkomp, Ingolstadt (DE); Marco Püschner, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 131 days.

(21) Appl. No.: 18/812,091

(22) Filed: Aug. 22, 2024

(65) Prior Publication Data

US 2025/0074208 A1     Mar. 6, 2025

(30) Foreign Application Priority Data

Sep. 5, 2023    (DE) .......................... 102023123835.3

(51) Int. Cl.
| | |
|---|---|
| *B60K 1/02* | (2006.01) |
| *B60L 7/18* | (2006.01) |
| *B60L 15/20* | (2006.01) |
| *B60L 15/38* | (2006.01) |
| *H02K 5/167* | (2006.01) |
| *H02K 5/173* | (2006.01) |

(52) U.S. Cl.
CPC ............. *B60L 15/2009* (2013.01); *B60L 7/18* (2013.01); *B60L 2240/421* (2013.01)

(58) Field of Classification Search
CPC .......... B60K 1/02; B60L 15/38; H02K 5/167; H02K 5/1672; H02K 5/1675; H02K 5/1677; H02K 5/173; H02K 5/1732; H02K 5/1735; H02K 5/1737
See application file for complete search history.

(56) References Cited

U.S. PATENT DOCUMENTS

| | | | | |
|---|---|---|---|---|
| 2011/0139522 A1* | 6/2011 | Takenaka | ............... | H02K 16/00 |
| | | | | 180/65.1 |
| 2021/0107456 A1* | 4/2021 | Kim | ......................... | B60L 3/108 |
| 2025/0206146 A1* | 6/2025 | Devaraj | ................. | B60K 17/16 |

FOREIGN PATENT DOCUMENTS

| | | |
|---|---|---|
| CN | 106425635 A | 2/2017 |
| DE | 102018113271 A1 | 12/2019 |
| DE | 102018131102 A1 | 12/2019 |
| DE | 102019107936 A1 | 10/2020 |
| EP | 0097606 A2 | 1/1984 |

* cited by examiner

*Primary Examiner* — Erick R Solis
(74) *Attorney, Agent, or Firm* — Seed Intellectual Property Law Group LLP

(57)    ABSTRACT

A method for operating a drive system is provided in which the drive system may include at least one electric drive unit and an auxiliary drive unit. The rotor shaft of at least one electric device unit may be mounted via plain bearings. The output shaft of the auxiliary drive unit may be mounted using roller bearings. The rotor shaft may be configured to be coupled to the output shaft. The method for operating the drive system may include determining an actual rotational speed of the electric drive unit, comparing the actual rotational speed with a limit rotational speed, deactivating the electric drive unit and activating the auxiliary drive unit if the actual rotational speed is lower than the limit rotational speed, and activating the electric drive unit if the actual rotational speed is greater than the limit rotational speed. A drive system and a vehicle are also provided.

12 Claims, 1 Drawing Sheet

METHOD FOR OPERATING A DRIVE SYSTEM

BACKGROUND

Technical Field

Figures 1, 2, 3:
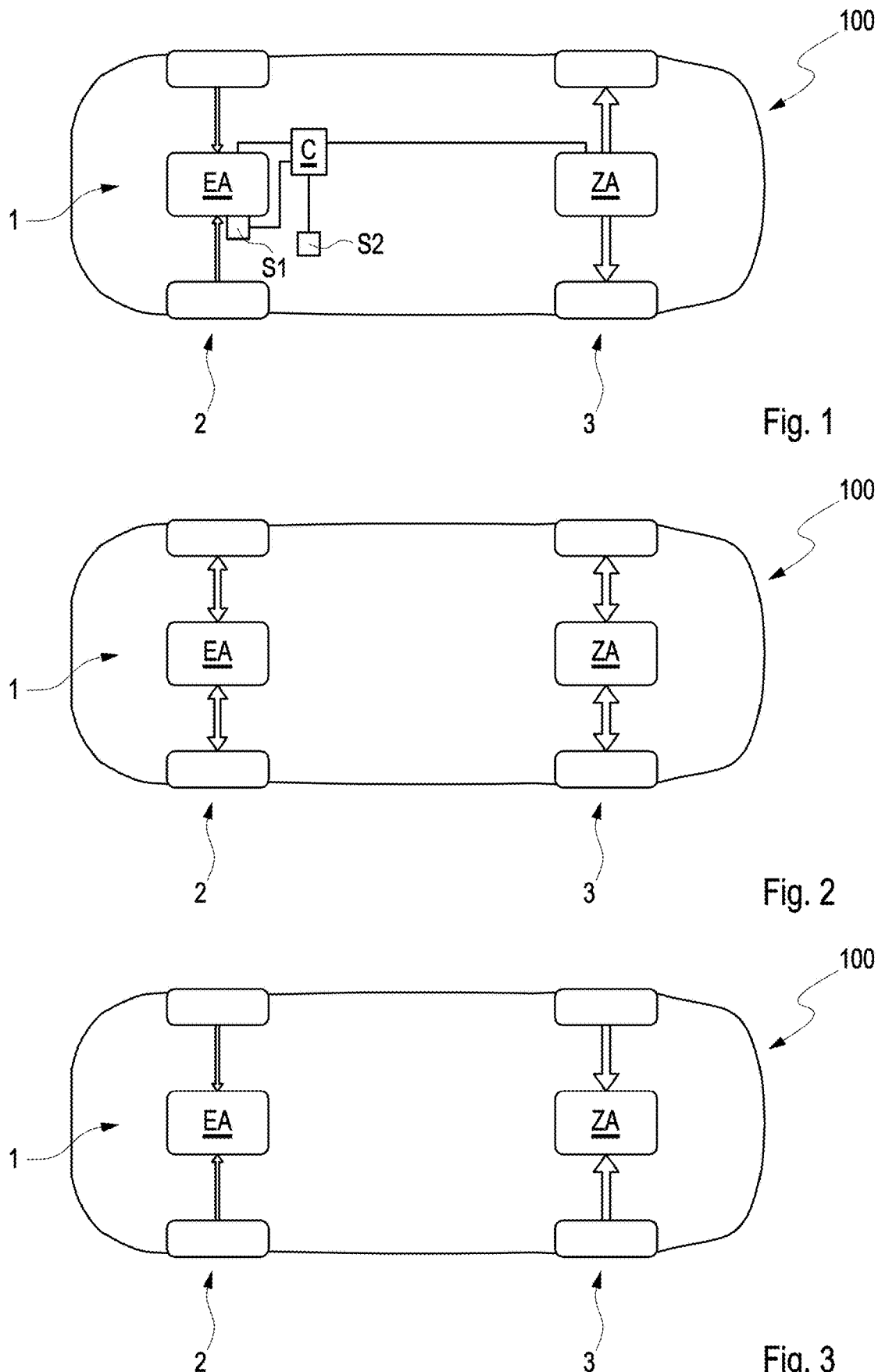

The disclosure relates to a method for operating a drive system, such as a drive system having at least one electric drive unit and an auxiliary drive unit, and further relates to a drive system and a vehicle with a drive system.

Description of the Related Art

Roller bearings are commonly used to mount the rotor shaft of an electric machine in electric drives or drive systems. Such roller bearings comprise a plurality of rolling elements that roll between or roll off two bearing rings. The advantage of such roller bearings is that they are already capable of bearing loads at low rotor shaft rotational speeds. Roller bearings do, however, also have the characteristic that friction in the bearing and the rolling noise increase significantly at high rotational speeds. There is, moreover, usually an electrically conductive solid contact in roller bearings via the movable rolling elements between the rotor shaft and housing, whereby electrical current can flow through the bearing. Such currents, which are also referred to as bearing currents, can have a disruptive effect on the operation of the electrical machine. An alternative bearing arrangement for the rotor shaft of an electric machine is a plain bearing, in particular a hydrodynamic plain bearing. Such plain bearings require a load-bearing lubricating film, which only forms above a limit rotational speed. Below this limit rotational speed, mixed friction or solid friction occurs in hydrodynamic plain bearings, which friction leads to severe wear of the plain bearing under load. Hydrodynamic plain bearings can therefore not be used as rotor shaft bearings in all operating conditions, particularly not at low speeds and under high torque loads on the rotor shaft. Hydrodynamic plain bearings do nonetheless have the advantage over roller bearings in that their friction is lower at high speeds. Plain bearings moreover generate less noise at high speeds than roller bearings.

DE 102019107936A1 describes a bearing arrangement for a shaft in an electrical machine. This bearing arrangement comprises a roller bearing unit and a plain bearing unit, which can be connected to each other and to the housing of the electrical machine by means of a coupling unit. Depending on the operating state, the plain bearing unit or the roller bearing unit can be activated in the electrical machine by actuating the coupling unit.

DE 102018131102A1 describes a method for damping vibrations in a transmission of a motor vehicle. For this purpose, the transmission comprises a hybrid bearing, which is configured as a roller bearing in some areas and as a plain bearing in others. At low rotational speeds, only the roller bearing bears the load in the hybrid bearing. At higher rotational speeds, if the roller bearing causes vibrations that are close to a resonance frequency of the transmission, the plain bearing is also activated, which dampens the vibrations.

CN 106425635A describes an electrical machine that has a hydrodynamic plain bearing at each end of its rotor shaft. Roller bearings with a contact angle of 25° are additionally arranged adjacent to these plain bearings to guide the rotor shaft.

BRIEF SUMMARY

The present disclosure provides a plain bearing which may be used stably and reliably in an electric machine in a drive system, including where the rotor shaft of the electric machine may be mounted exclusively by way of the plain bearing.

The present disclosure provides a method for operating a drive system, wherein the drive system may comprise at least one electric drive unit, the rotor shaft of which may be mounted relative to a housing using plain bearings, and wherein the drive system may comprise an auxiliary drive unit, the output shaft of which may be mounted relative to a housing using roller bearings, wherein the rotor shaft of the electric drive unit may be coupled to the output shaft of the auxiliary drive unit, wherein the method may comprise:

A) determination of the actual rotational speed of the electric drive unit and comparison of this actual rotational speed with a limit rotational speed, wherein the limit rotational speed may be a rotational speed above which a load-bearing lubricating film forms in the plain bearings of the electric drive unit, B) deactivation of the electric drive unit and activation of the auxiliary drive unit if the actual rotational speed is lower than the limit rotational speed, wherein the rotor shaft of the electric drive unit may be coupled to the output shaft of the auxiliary drive unit, and C) activation of the electric drive unit if the actual rotational speed is greater than the limit rotational speed.

The method according to the disclosure may be configured such that an electric drive unit with a rotor shaft mounted on plain bearings may first be used for driving or braking in a drive system if the rotor shaft is already rotating at a rotational speed which is greater than a limit rotational speed. The limit rotational speed may be a rotational speed above which a load-bearing lubricating film forms in the plain bearings of the electric drive unit, such that wear in the plain bearings is very low. Until the limit rotational speed is reached, the electric drive unit may be coupled with an auxiliary drive unit, which may entrain the electric drive unit. To execute the method according to the present disclosure, a drive system may be used which comprises both an electric drive unit and an auxiliary drive unit, wherein the two machines can be coupled to each other or are coupled to each other. Coupled means that the rotor shaft of the electric drive unit is in a rotationally active connection with the output shaft of the auxiliary drive unit. This means that the rotation of the output shaft of the auxiliary drive unit transmits its rotary motion to the rotor shaft of the electric drive unit. The rotor shaft of the electric drive unit may be mounted using plain bearings relative to a housing of the electric drive unit. The rotor shaft of the electric drive unit may be exclusively mounted using plain bearings relative to a housing of the electric drive unit. The output shaft of the auxiliary drive unit, on the other hand, may be mounted relative to a housing on roller bearings. The drive system may comprise further components, which will be described later. Preferably, the method according to the present disclosure may be executed starting from a state in which the drive system is booted up and the actual rotational speed of the electric drive unit is lower than the limit rotational speed. Method step A) may therefore initially be executed in combination with method step B). In the method according to the present disclosure, the actual rotational speed of the electric drive unit may be determined in method step A) and may be compared with the known limit rotational speed above which a load-bearing lubricating film forms in the plain bearings. Method step A) may be executed regularly or continuously during the execution of the method according to the disclosure. In this way, the current actual rotational speed may always be known. If the actual rotational speed determined in method step A) is lower than the limit rotational speed, then method step B) may be executed. In method step B), the electric machine may be deactivated and may only be entrained passively by way of the coupling with the auxiliary drive unit. In this deactivated state, the electric drive unit does not generate any drive torque or braking torque. When entraining, only the inertia of the rotor shaft needs to be overcome. In this way, the load on the plain bearings of the electric drive unit may be very low and only minimal wear may occur, notwithstanding that no load-bearing lubricating film has yet formed in the plain bearings. If an actual rotational speed is determined in method step A) which is greater than the limit rotational speed, method step C) may be executed. The previously performed method step B) may no longer be performed if the actual rotational speed is greater than the limit rotational speed. In method step C), the electric drive unit may now be activated. Activation here means that the electric drive unit generates either a drive torque or a braking torque electrically and outputs it by means of the rotor shaft. Above the limit rotational speed, the rotor shaft may be mounted in a very wear-resistant and stable manner by the plain bearings. In particular, at higher rotational speeds, the advantages of a plain bearing out-weigh those of a roller bearing. The method according to the disclosure may enable the use of an electric drive unit with a rotor shaft that is mounted exclusively on plain bearings. This mounting of the electric drive unit may increase friction and thus the efficiency of the drive system. At the same time, the lubricating film in the plain bearing may reduce noise and may avoid electrical bearing currents in the bearings. In this way, the service life of the electric machine bearings may be increased. An auxiliary drive unit may be provided for operating conditions in which the rotational speed of the electric drive unit is below the limit rotational speed. This auxiliary drive unit may also be arranged at a distance from the electric drive unit. The auxiliary drive unit may, for example, be an electric drive unit, the output shaft or rotor shaft of which is mounted on a roller bearing. In some embodiments, the auxiliary drive unit may be a different type of drive unit, for example, an internal combustion engine or a hydraulic motor. The method according to the disclosure may be used to operate a drive system which is arranged in a vehicle. The drive system may, however, also be used in a working machine, for example, a machine tool. The method according to the disclosure may be used particularly advantageously in a vehicle in which two axles are driven by the drive system.

In some embodiments, the auxiliary drive unit may be configured as an electric auxiliary drive unit and/or the drive system may be arranged in a vehicle, wherein the electric drive unit may drive a first axle of the vehicle in method step C) and the auxiliary drive unit may drive a second axle of the vehicle in method step B), wherein the first axle is coupled or at least can be coupled to the second axle, such as the first axle being coupled to the second axle by way of wheels arranged on the axles, which wheels rest or roll on a common surface. In such embodiments, the auxiliary drive unit may be configured as an electric auxiliary drive unit, but unlike the electric drive unit, the auxiliary drive unit may be equipped with roller bearings. The drive system may be arranged in a vehicle and may provide the drive for moving the vehicle. The electric drive unit may drive a different axle of the vehicle than the auxiliary drive unit. The electric drive unit may drive either the front axle or the rear axle of the vehicle. The rotor shafts of the two electric machines may each be coupled by way of the wheels of an axle and a common surface, for example a road. In such embodiments, separate components or elements may not be required to couple the electric drive unit and the auxiliary drive unit. This makes the configuration of the drive system very simple. Alternatively, the electric drive unit and the auxiliary drive unit may be coupled to each other in another way, for example by a connection with a chain or a belt. The two electric machines may drive a common rotor shaft and may be coupled together by this common shaft.

In some embodiments, the electric drive unit may be entrained by the auxiliary drive unit in method step B) as a result of the coupling. Entraining means that the electric drive unit does not apply any electric torque to the rotor shaft. The rotor shaft may be turned passively from the outside by the auxiliary drive unit, wherein only the friction of the rotor shaft against the plain bearings and the mass inertia of the rotor must be overcome as resistance. The load on the plain bearings of the electric machine may be significantly lower during entraining than in a case in which the electric drive unit itself transmits an electric torque to the rotor shaft.

In some embodiments, the auxiliary drive unit may remain activated or may be deactivated in method step C). In method step C), the electric drive unit may be activated and may transmit a torque to its rotor shaft. In the drive system, in method step C), a drive may simultaneously occur both by the electric drive unit as well as by the auxiliary drive unit. Alternatively, the auxiliary drive unit may be deactivated in method step C) and the drive system may only be driven by the electric drive unit with the plain bearings. Depending on the dimensions of the two electric machines, drive systems with different characteristics may be provided and operated. If such a drive system is intended to rotate a rotor shaft at high rotational speed, the auxiliary drive unit may preferably be deactivated at these high rotational speeds in order to avoid high noise levels and high friction in the roller bearings. In this case, the auxiliary drive unit may only serve as a starting aid for an electric drive unit, which may be equipped exclusively with plain bearings.

In some embodiments, a query may be executed after a change in the actual rotational speed of the electric drive unit, wherein the result of this query may assume at least the three states of acceleration, deceleration or constant operation. Such a query may be provided in order to be able to influence the method or the drive system at the request of an operator. An operator may desire that the drive system accelerate, decelerate or continue to operate continuously without variation. To execute such a query, a query sensor may be provided, which queries the desire of the operator and inputs the result into the method. Such a query relating to a desired change in the actual rotational speed of the electric drive unit may then flow into the execution of the method in the same way as a comparison of the actual rotational speed with the limit rotational speed in method step A). The query for a change in the actual rotational speed may also preferably be executed continuously in the method.

If the result of the query assumes an acceleration state after the actual rotational speed has changed, method step B) may be initiated and method step C) may be initiated after the limit rotational speed has been exceeded, wherein a drive torque may be applied to the electric drive unit. If an acceleration of the drive system is desired, method step B) may be initiated first and a drive torque may be applied to the auxiliary drive unit. Once the limit rotational speed has been reached, method step C) may be initiated and a drive torque may be applied to the electric drive unit. If the drive system is already in method step C) when the state changes from braking or constant operation to acceleration, this method step may be continued and, in this case, method step B) does not need to be executed.

If the result of the query assumes a braking state after the actual rotational speed has changed, method step C) may be executed until the rotational speed falls below the limit rotational speed, wherein in method step C) a braking torque may be applied to the electric drive unit and, after the rotational speed falls below the limit rotational speed, method step B) may be initiated, wherein a braking torque may be applied to the auxiliary drive unit or wherein an additional brake may be used to brake the electric drive unit and/or the auxiliary drive unit. If the drive system is to be braked while step C) is being executed, a braking torque may be applied to the electric drive unit. A braking torque may also be applied to the auxiliary drive unit. If the drive system is braked to such an extent that the actual rotational speed of the electric drive unit is lower than the limit rotational speed, the electric drive unit may be deactivated. If the drive system is to be braked further in this state, a braking torque may be applied to the auxiliary drive unit or an additional brake may be used for braking. Such an additional brake may, for example, be formed by a mechanical friction brake which acts on the rotor shaft of the electric drive unit or the output shaft of the auxiliary drive unit.

If the result of the query assumes a state of constant operation after the actual rotational speed has changed, method step B) or method step C) may continue to be executed continuously. In a case in which the rotational speed of the drive system is to be kept constant, the currently executed method step B) or C) may be continued without variation. It is, however, possible that, in this state, the application of a drive torque or braking torque to the electrical machines may be changed, for example in a case in which the load on the drive system changes but its rotational speed is to be kept constant.

The present disclosure further discloses a drive system, wherein the drive system may comprise at least one electric drive unit, the rotor shaft of which may be mounted relative to a housing by way of plain bearings, and wherein the drive system may further comprise an auxiliary drive unit, the output shaft of which may be mounted relative to a housing by roller bearings, wherein the rotor shaft of the electric drive unit may be coupled or at least may be coupled to the output shaft of the auxiliary drive unit, wherein at least one sensor may be provided which detects the actual rotational speed of the electric drive unit and wherein at least one control system may be provided which is connected to the sensor, the electric drive unit, and the auxiliary drive unit, wherein the control system may be configured to execute a method according to one of the previously described embodiments.

Some of the components or parts of the drive system according to the disclosure have already been described in connection with the method. This description also applies in connection to the drive system. The drive system may also comprise a sensor which determines the actual rotational speed of the electric drive unit and may transmit the actual rotational speed of the electric drive unit to a control system. This sensor may be preferably arranged in or on the electric drive unit. The control system may be connected to the electric drive unit and the auxiliary drive unit by data connections and may be configured to control the electric drive unit by signals, such as by controlling the torque provided by these drive units.

The drive system according to the disclosure has the advantage that less installation space may be required in the electric drive unit through the use of plain bearings instead of roller bearings. This means that the electric drive unit may be smaller. As the lubricant used in the plain bearings is not electrically conductive, there may be no bearing currents in the plain bearings that could disrupt the operation of the electric machine or lead to increased wear of the bearings. The lubricant in the plain bearings may also have a mechanical vibration-damping effect, which may reduce the development of noise compared to roller bearings. The plain bearings may be particularly advantageous at high rotational speeds of the electric drive unit, as they may have lower friction and experience very little wear due to the exclusive presence of fluid friction. The drive system according to the disclosure may enable the stable use of an electric drive unit, which may be provided exclusively with plain bearings, in a drive system.

In some embodiments of the drive system, a query sensor may be provided which is configured to execute a query relating to the change of the actual rotational speed of the electric drive unit, wherein the result of this query may assume at least the three states of acceleration, deceleration or constant operation and the query sensor may be connected to the control system. In such embodiments, at least one query sensor may be provided, which may be intended to query the desire of the operator to change the actual rotational speed. Such a query sensor may, for example, be configured as an operating lever which can be moved to different positions for the three results or states. When the drive system is used in a vehicle, the query sensor may also be formed by one or more pedals, which are actuated by an operator or driver by pressing them in order to express a request to change the actual rotational speed. Alternatively, the query sensor may also be formed by an input interface which is connected to a drive control unit. Such a drive control unit may, for example, be formed by a cruise control or another automatic control system of the drive system. In this case, the request to change the actual rotational speed of the electric drive unit may not be transmitted to the drive system by a human operator, but rather by a computer-aided, automatic control on the drive system.

The present disclosure further discloses a vehicle with a drive system according to one of the embodiments described above, such as a vehicle wherein a first axle of the vehicle may be driven by the electric drive unit and a second axle of the vehicle may be driven by the auxiliary drive unit. In the vehicle according to the present disclosure, a drive system according to the disclosure may be provided to drive the vehicle. Preferably, the vehicle may be an all-wheel drive motor vehicle in which the electric drive unit and the auxiliary drive unit each drive a drive axle. The vehicle according to the disclosure may enable the stable and reliable use of a plain bearing in an electric drive unit without the plain bearings of the electric drive unit being exposed to high wear in certain operating states.

Features, effects and advantages disclosed in connection with the method are also deemed to be disclosed in connection with the drive system and the vehicle. The same applies vice versa; features, effects and advantages which are disclosed in connection with the drive system and/or the vehicle are also deemed to be disclosed in connection with the method.

BRIEF DESCRIPTION OF THE SEVERAL
VIEWS OF THE DRAWINGS

FIG. 1 shows a schematic plan view of a vehicle when the
control system of the vehicle executes method step B).
FIG. 2 shows a schematic plan view of the vehicle of FIG.
1 when the control system of the vehicle executes method
step C).
FIG. 3 shows a schematic plan view of the vehicle from
FIG. 1 when the control system of the vehicle executes
method step C) or B) in an alternative embodiment.

DETAILED DESCRIPTION

FIG. 1 shows a schematic plan view of a vehicle 100
according to one embodiment of the present disclosure,
wherein the control system C of the vehicle executes method
step B). In FIG. 1, a vehicle 100 is shown in a simplified
manner when viewed from above. The vehicle 100 may be
an electrically driven motor vehicle with two axles 2, 3
arranged one behind the other. In the embodiment shown in
FIG. 1, the wheels of the front axle shown on the left, which
forms the first axle 2, may be driven by an electric drive unit
EA, which may only comprise plain bearings for mounting
the rotor shaft. The rear axle shown on the right, which
forms the second axle 3, may be driven by an auxiliary drive
unit ZA, which may also be configured as an electric drive
unit. The rotor shaft of the auxiliary drive unit ZA may be
mounted exclusively on roller bearings. The electric drive
unit EA and the auxiliary drive unit ZA may each comprise
their own housing, wherein the housings may be structurally
separated from one another. In the embodiment shown in
FIG. 1, the rotor shafts of the electric drive unit EA and the
auxiliary drive unit ZA may be coupled by the wheels of the
two axles 2, 3, which rest or roll on a common surface, in
this case a road. If, for example, the wheels of the second
axle 3 are turned by the auxiliary drive unit ZA, the vehicle
moves translationally over the surface. In this way, the
wheels of the first axle 2 may be rotated and this rotational
movement may be transmitted to the rotor shaft of the
electric drive unit EA. In the embodiment shown, the two
axles 2, 3 and thereby the rotor shafts of the electric drive
unit EA and the auxiliary drive unit ZA may be permanently
rotationally coupled to each other. The vehicle 100 may
comprise a drive system 1, which includes the two electric
machines. The drive system 1 may further comprise a
control system C, which may be connected, at least by way
of a data connection, both to the electric drive unit EA and
to the auxiliary drive unit ZA. The drive system 1 may
further comprise a sensor S1, which may determine the
actual rotational speed of the electric drive unit EA and may
transmit the actual rotational speed of the electric drive unit
EA to the control system C. The drive system 1 may further
include a query sensor S2, which may be configured to
execute a query after a change in the actual rotational speed.
In the embodiment shown, the query sensor S2 may com-
prise two pedals that generate two different signals. The first
pedal may be an accelerator pedal, which may be used by the
driver of the vehicle 100 to express the desire to accelerate
the vehicle 100 by pressing the pedal. The other pedal of the
query sensor S2 may be a brake pedal, which may be used
by the driver of the vehicle 100 to express the desire to brake
the vehicle 100. Pressing the accelerator pedal causes the
query sensor S2 to output the acceleration status as a result.
Pressing the brake pedal may cause the query sensor S2 to
output the braking status as a result. If neither pedal is
pressed, the query sensor S2 may output the constant operation status as a result. The results or signals from the query
sensor S2 may also be transmitted to the control system C by
way of a data connection. In some embodiments, query
sensor S2 may be configured differently, for example, as a
lever which may be moved to different positions in order to
output the different states as a result. The control system C
of the drive system 1 of the vehicle 100 may be configured
to execute a method according to the disclosure.

In the state shown in FIG. 1, the vehicle 100 may be in the
start-up process. The vehicle 100 may be accelerating from
a standstill. In the state shown, the actual rotational speed of
the electric drive unit EA may be lower than the limit
rotational speed above which a load-bearing lubricating film
forms in the plain bearings of the electric drive unit EA. In
the embodiment shown, method step A) may be executed
continuously, whereby the actual rotational speed of the
electric drive unit EA may continuously be determined by
the sensor S1 and compared with the limit rotational speed.
Since the actual rotational speed may be lower than the limit
rotational speed in the state shown, method step B) may be
executed, wherein the electric drive unit EA may be deac-
tivated and the auxiliary drive unit ZA may be activated. In
the state shown, the driver of the vehicle 100 may press the
accelerator pedal so that the sensor S2 outputs the accelera-
tion state as a result. In method step B), a drive torque may
be applied to the auxiliary drive unit ZA, causing the wheels
of the second axle 3 to be rotationally accelerated. The
vehicle 100 may be accelerated translationally to the left by
way of the wheels of the second axle 3. The translatory
movement of the vehicle 100 may in turn be transferred to
the rotor shaft of the non-driven electric drive unit EA by
way of the wheels of the first axle 2. In this way, in the state
shown, the electric drive unit EA may be entrained by the
translational movement of the vehicle 100. The drive torque
of the auxiliary drive unit ZA is symbolized by arrows
pointing from the auxiliary drive unit ZA to the wheels of the
second axle 3. The entraining of the electric drive unit EA
may be symbolized by arrows which point from the wheels
of the first axle 2 to the electric drive unit EA. The
acceleration of the vehicle 100 by the auxiliary drive unit ZA
continues until the actual rotational speed of the entrained
electric drive unit EA exceeds the limit rotational speed.
Once this limit rotational speed is exceeded, method step C)
may be executed and the electric drive unit EA may be
activated and a torque may be applied to the electric drive
unit EA. After initiating method step C), the vehicle 100 may
also be driven by the electric drive unit EA. In this state, the
plain bearings of the electric drive unit EA may have a
load-bearing, stable lubricating film, so that the rotor shaft is
mounted with very low wear relative to the housing of the
electric drive unit EA. A possible state during the execution
of method step C) is shown in FIG. 2 and an alternative state
during the execution of method step C) is shown in FIG. 3.

FIG. 2 shows a schematic plan view of the vehicle 100 of
FIG. 1, with the control system C of the vehicle 100
executing method step C). In FIG. 2, only the two electrical
machines EA and ZA are shown; the other components of
the drive system 1, as shown in FIG. 1, are not shown for the
sake of simplicity. In FIG. 2, the control system C of the
vehicle 100 executes method step C). The start-up process,
which is shown in FIG. 1, is completed in FIG. 2 and the
vehicle 100 may move at a speed that is so high that the
actual rotational speed of the electric drive unit EA is greater
than the limit rotational speed. In this way, the electric drive
unit EA may be activated and may have a drive torque or
braking torque applied thereto. The electric drive unit EA is
symbolically connected to the wheels of the first axle 2 by double arrows, which point both to the wheels and to the electric drive unit EA. The auxiliary drive unit ZA and the wheels of the second axle 3 are also symbolically connected by such double arrows. This means that in method step C), a drive torque may be transmitted from the electric machines EA and ZA to the wheels and, conversely, a braking torque may be transmitted from the wheels to the electric machines EA and ZA. Whether a driving torque or a braking torque is applied to the electric machines EA and ZA may be influenced by the signal or result of the query sensor S2, which is not shown. If the result of the query sensor S2 assumes the acceleration state, a drive torque may be applied to the wheels of both electric machines EA and ZA in order to accelerate the vehicle 100. If the result of the query sensor S2 assumes the deceleration state, a braking torque may be applied to the wheels of both electric machines EA and ZA in order to decelerate the vehicle 100. It is moreover possible that in a case in which the result of the query sensor S2 assumes the state of constant operation, the electric machines EA and ZA may not be subjected to any torque, but nevertheless may remain activated in order to be able to generate a torque or a braking torque immediately in the event of a change in the state of the result of the query sensor S2. The symbolically-depicted method step C) is therefore always executed if the vehicle 100 has completed the start-up process and is moving at a speed that corresponds to an actual rotational speed of the electric drive unit EA that is greater than the limit rotational speed. Acceleration, constant operation or braking of the vehicle 100 takes place depending on the desire of the driver, which is represented or queried by the result or the state of the query sensor S2. An advantage of the method according to the disclosure and of the drive system 1 according to the disclosure is that while step C) is being executed, the auxiliary drive unit ZA may also be deactivated and the vehicle can be driven and braked exclusively by the electric drive unit EA. By switching off the auxiliary drive unit ZA at higher rotational speeds, the advantages of the rotor shaft of the electric drive unit EA, which may be mounted on plain bearings, can be used to great advantage. In particular at high rotational speeds, the plain bearing may be significantly more efficient and may produce a lower noise level than a roller bearing. It may be possible, for example, to make the auxiliary drive unit ZA of small dimensions in order to provide sufficient torque for the start-up process. Once the start-up process has been completed and method step C) has been initiated, the movement of the vehicle 100 may be taken over exclusively by a larger electric drive unit EA with plain bearings. In this way, the different bearing types may be optimally utilized and deployed. The case in which the vehicle 100 is to be braked and brought to a standstill from a state in which method step C) is executed is described in connection with FIG. 3.

FIG. 3 shows a schematic plan view of the vehicle 100 from FIG. 1, with the control system C of the vehicle 100 executing method step C) or B) in an alternative embodiment. FIG. 3 symbolizes a state in which the vehicle 100 is to be braked to a standstill. Firstly, as shown in FIG. 2, method step C) is executed, in which both electric machines EA and ZA may be activated for braking and a braking torque may be applied to both. During braking, the speed of the vehicle 100 and thus the actual rotational speed of the electric drive unit EA may be reduced by the coupling of the tires to the ground. As soon as the actual rotational speed of the electric drive unit EA falls below the limit rotational speed, method step C) may end and method step B) may be started. Method step A) may also be executed continuously in this state. In the state shown in FIG. 3, method step B) is already being executed. Similarly to the state shown in FIG. 1, the electric drive unit EA may be deactivated and may be entrained by the residual movement of the vehicle 100. This entrainment is symbolized by the thin arrows pointing from the wheels of the first axle 2 to the electric drive unit EA. In contrast to the state shown in FIG. 1, a braking torque may be applied to the auxiliary drive unit ZA in FIG. 3, which is symbolized by arrows pointing from the wheels of the second axle 3 towards the auxiliary drive unit ZA. The vehicle 100 may thus be braked to a standstill by the auxiliary drive unit ZA. Alternatively, it is also possible to allow the vehicle 100 to coast to a standstill. During this coasting, the auxiliary drive unit ZA is not subjected to a braking torque and the vehicle 100 is only braked by the unavoidable friction. If the braking torque of the auxiliary drive unit ZA is not sufficient for heavy braking, an additional brake, for example a friction brake, can be provided, which may additionally brake the vehicle 100 or alternatively its wheels.

German patent application no. 102023123835.3, filed Sep. 5, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a drive system that comprises:

at least one electric drive unit, a rotor shaft of the at least one electric drive unit being mounted relative to a housing of the at least one electric drive unit via plain bearings; and an auxiliary drive unit, an output shaft of the auxiliary drive unit being mounted relative to a housing of the auxiliary drive unit using roller bearings, wherein the rotor shaft of the at least one electric drive unit is configured to be coupled to the output shaft of the auxiliary drive unit, the method comprising:

determining an actual rotational speed of the electric drive unit;

comparing the actual rotational speed with a limit rotational speed, the limit rotational speed being a rotational speed above a rotational speed at which a load-bearing lubricating film forms in the plain bearings of the electric drive unit;

deactivating the electric drive unit and activating the auxiliary drive unit if the actual rotational speed is lower than the limit rotational speed, wherein the rotor shaft of the electric drive unit is coupled to the output shaft of the auxiliary drive unit; and activating the electric drive unit if the actual rotational speed is greater than the limit rotational speed.

2. The method according to claim 1, wherein the auxiliary drive unit is configured as an electric auxiliary drive unit and/or the drive system is arranged in a vehicle, wherein the electric drive unit drives a first axle of the vehicle when the electric drive unit is activated due to the actual rotation speed being greater than the limit rotational speed and the auxiliary drive unit drives a second axle of the vehicle when the electric drive unit is deactivated and the auxiliary drive unit is activated due to the actual rotational speed being lower than the limit rotation speed, and wherein the first axle is configured to be coupled to the second axle.

3. The method according to claim 2, wherein the first axle is coupled to the second axle by way of wheels arranged on the first and second axles resting or rolling on a common surface.

4. The method according to claim 1, wherein when the electric drive unit is deactivated and the auxiliary drive unit is activated due to the actual rotational speed being lower than the limit rotational speed, the electric drive unit is entrained by the auxiliary drive unit as a result of the coupling.

5. The method according to claim 1, wherein the auxiliary drive unit remains activated or is deactivated when the electric drive unit is deactivated and the auxiliary drive unit is activated due the actual rotational speed being lower than the limit rotational speed.

6. The method according to claim 1, wherein a query is executed after a change in the actual rotational speed of the electric drive unit, wherein the result of this query is at least one state of an acceleration, a deceleration, and a constant operation.

7. The method according to claim 6, wherein, if the result of the query is the acceleration state after the actual rotational speed has changed, the electric drive unit is deactivated and the auxiliary drive unit is activated and the electric drive unit is activated after the limit rotational speed has been exceeded, wherein a drive torque is applied to the electric drive unit.

8. The method according to claim 6, wherein, if the result of the query is the braking state after the actual rotational speed has changed, the electric drive unit is activated until the rotational speed falls below the limit rotational speed, wherein a braking torque is applied to the electric drive unit and, after the rotational speed falls below the limit rotational speed, the electric drive unit is deactivated and the auxiliary drive unit is activated, wherein a braking torque is applied to the auxiliary drive unit or wherein an additional brake is used to brake the electric drive unit and/or the auxiliary drive unit.

9. The method according to claim 6, in which, if the result of the query is the state of constant operation after the actual rotational speed has changed, the electric drive unit continues to be deactivated and the auxiliary drive unit continues to be activated continuously or the electric drive unit continues to be activated continuously.

10. A drive system comprising:

at least one electric drive unit having a rotor shaft mounted relative to a housing of the at least one electric drive unit by plain bearings;

an auxiliary drive unit having an output shaft mounted relative to a housing of the auxiliary drive unit by roller bearings, wherein the rotor shaft of the electric drive unit is configured to be coupled to the output shaft of the auxiliary drive unit;

at least one sensor configured to detect the actual rotational speed of the electric drive unit; and at least one control system connected to the sensor, the electric drive unit, and the auxiliary drive unit, wherein the control system is configured to execute a method comprising:

determining an actual rotational speed of the electric drive unit;

comparing the actual rotational speed with a limit rotational speed, the limit rotational speed being a rotational speed above a rotational speed at which a load-bearing lubricating film forms in the plain bearings of the electric drive unit;

deactivating the electric drive unit and activating the auxiliary drive unit if the actual rotational speed is lower than the limit rotational speed, wherein the rotor shaft of the electric drive unit is coupled to the output shaft of the auxiliary drive unit; and activating the electric drive unit if the actual rotational speed is greater than the limit rotational speed.

11. A vehicle with a drive system comprising:

at least one electric drive unit having a rotor shaft mounted relative to a housing of the at least one electric drive unit by plain bearings;

an auxiliary drive unit having an output shaft mounted relative to a housing of the auxiliary drive unit by roller bearings, wherein the rotor shaft of the electric drive unit is configured to be coupled to the output shaft of the auxiliary drive unit;

at least one sensor configured to detect the actual rotational speed of the electric drive unit; and at least one control system connected to the sensor, the electric drive unit, and the auxiliary drive unit, wherein the control system is configured to execute a method comprising:

determining an actual rotational speed of the electric drive unit;

comparing the actual rotational speed with a limit rotational speed, the limit rotational speed being a rotational speed above a rotational speed at which a load-bearing lubricating film forms in the plain bearings of the electric drive unit;

deactivating the electric drive unit and activating the auxiliary drive unit if the actual rotational speed is lower than the limit rotational speed, wherein the rotor shaft of the electric drive unit is coupled to the output shaft of the auxiliary drive unit; and activating the electric drive unit if the actual rotational speed is greater than the limit rotational speed.

12. A vehicle according to claim 11, wherein a first axle of the vehicle is configured to be driven by the electric drive unit and a second axle of the vehicle is configured to be driven by the auxiliary drive unit.

* * * * *